Aug. 3, 1954 J. E. A. NIXON 2,685,620

THERMIONIC VALVE AMPLIFIER WITH FEEDBACK DATUM LEVEL CONTROL

Filed April 5, 1951

Inventor:
John Esmonde Arthur Nixon
By his attorneys:
Baldwin + Wight

Patented Aug. 3, 1954 2,685,620

UNITED STATES PATENT OFFICE 2,685,620

THERMIONIC VALVE AMPLIFIER WITH FEEDBACK DATUM LEVEL CONTROL

John Esmonde Arthur Nixon, Colchester, England, assignor to Marconi's Wireless Telegraph Company Limited, London, England, a company of Great Britain Application April 5, 1951, Serial No. 219,438

Claims priority, application Great Britain May 18, 1950

4 Claims. (Cl. 179—171)

Figures 1, 2:
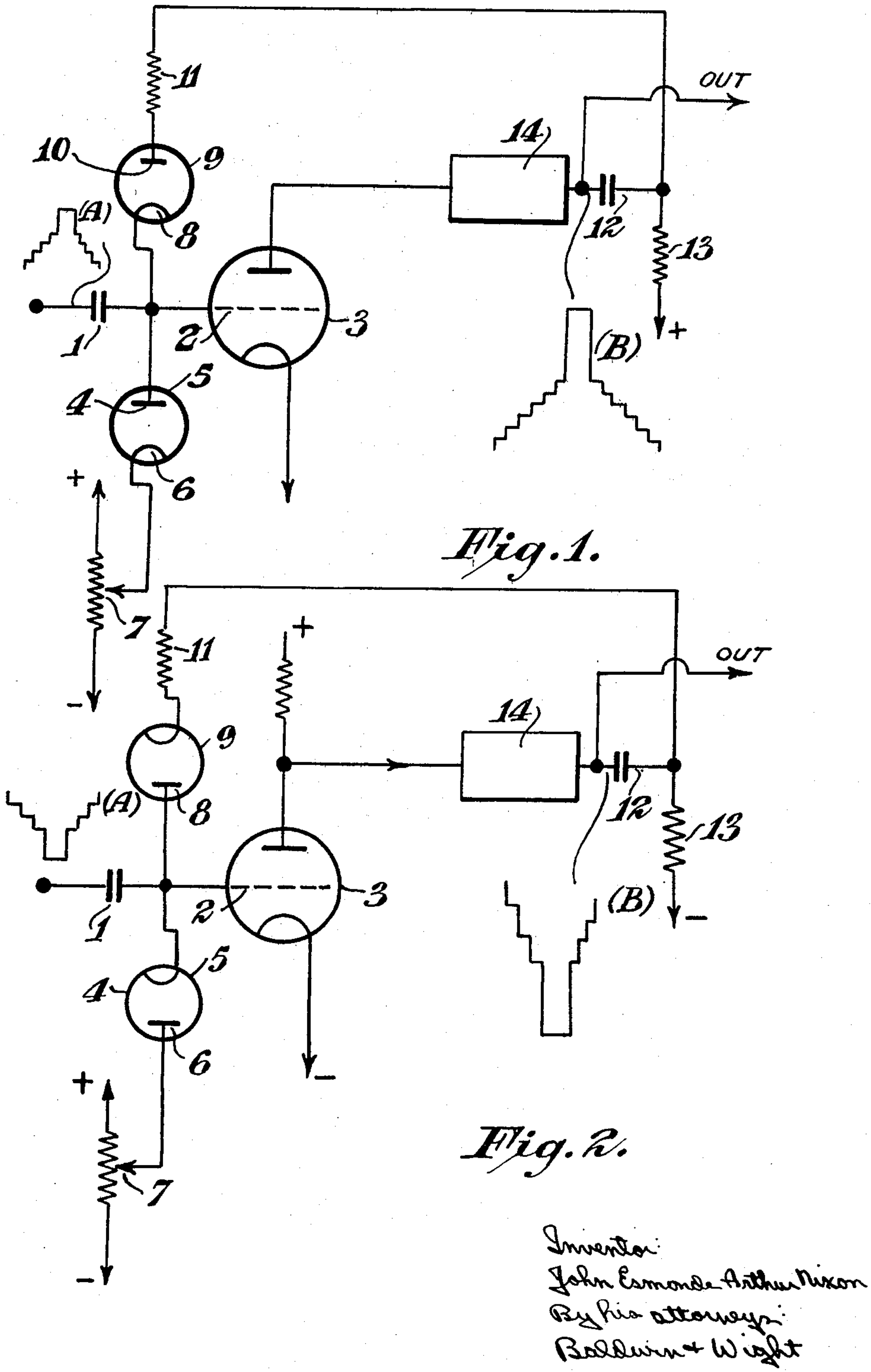

This invention relates to thermionic valve amplifiers and has for its object to provide improved and simple means for maintaining a predetermined datum level in the amplified output.

Though not limited exclusively to its application thereto the invention is primarily intended for and particularly applicable to amplifiers for television signals of the kind in which video signals and synchronizing signals form a composite signal in which the synchronizing signals are in the form of "blacker than black" or (sometimes) "whiter than white" pulses i. e. pulses which are below (or above) a particular voltage while video signals are above (or below) that voltage. It is a usual requirement in television systems employing such composite signals that the synchronizing pulses shall reach a predetermined voltage value and, as will be at once appreciated, if the signal is passed through a resistance-capacity inter-valve coupling, this requirement will not be satisfied unless special provision is made for the purpose.

It is usual practice at the present time to make provision for satisfying the above requirement by connecting a diode or other rectifier between the grid of the valve which is fed through the resistance-capacity coupling and some point of fixed (and, if desired, adjustable) datum potential. This practice has a number of defects. Firstly, for correct operation, each synchronizing pulse should be such that, were the diode circuit not provided, it would cross the datum potential level. Now the time-constant of the resistance-capacity coupling must be large enough to ensure that the maximum potential change on the coupling condenser due to charging and discharging it does not exceed a predetermined permissible percentage of the "peak white" signal voltage, (assuming, as the usual practical case, that the synchronizing signals are "blacker than black"). Accordingly the excess amount by which each synchronizing pulse would cross the datum potential level were the diode circuit absent can only be small and this in turn means that if the amplifier now considered is preceded by some other circuit which has distorted the "bottom level" of the synchronizing signal, the change in said level in any one line may be more than the above mentioned excess amount and in the opposite direction to it. As a result the pulse "bottom" may fail to reach the datum value at which the diode operates. In other words the diode circuit is only unidirectional in its operation, cutting off pulses which cross the datum level but inoperative as respects pulses which do not reach it.

Another defect is that the resistance of the diode circuit by which changes in the state of charge of the coupling condenser are removed is a factor in determining the effective time constant of the coupling network while discharge is taking place and may be so large as to make said time constant very large as compared to the width of a line synchronizing pulse. If this is the case proper discharge of the condenser will not occur during a line synchronizing pulse though it may occur in a frame synchronizing pulse which is here assumed, as is normally the case in practice, to be considerably wider than a line synchronizing pulse. Accordingly the desired object—the maintenance of constant pulse bottom level—will not be fully achieved. Moreover the amount of charge to be removed from the coupling condenser varies with the amplitude of the picture signals and this also may cause undesired variation of the pulse bottom level. The ideal resistance-capacity coupling—i. e. ideal from the coupling viewpoint—is of course, one employing a coupling condenser of very small value but, if such a condenser is used, the obtaining of the required time constant involves the provision of a resistance of too high a value to be tolerated in the grid circuit.

The present invention seeks to eliminate or substantially reduce the foregoing defects.

According to this invention a thermionic valve amplifier comprising means for maintaining a predetermined datum level in the amplified output is provided with two rectifiers for this purpose, one connected in circuit between the control grid of the valve and a point of datum potential and the other connected in circuit between said control grid and a source of signals in the same sense as the signal at said control grid, the rectifiers being connected in such senses that the one is operative for current flow away from said grid and the other is operative for current flow towards said grid. This arrangement constitutes a system which is bi-directional in operation and is such as to enable the resistance element to be eliminated from the coupling to the valve.

Preferably the rectifiers are diodes and preferably also the above mentioned source is a point in an amplifying network succeeding said valve.

A preferred arrangement consists of a coupling condenser between the source of input signals and the control grid of the valve, a first rectifier connected between said control grid and a point of datum potential and a second rectifier connected on one side to said control grid and on the other side through a resistance to a point between the resistance and capacity elements of a resistance-capacity output coupling of a succeeding amplifier, said point being such that the amplified signal appearing there is in the same sense as that on said control grid and said rectifiers being so connected that one is conductive towards the grid and the other is conductive away from it.

Preferably the rectifier connected between the control grid and a point of datum potential is connected to said point through a resistance element which is adjustable to permit of adjustment of the desired datum level.

The invention is illustrated in the accompanying drawings which show diagrammatically two embodiments thereof.

Referring to Figure 1 a composite signal conventionally represented at A and consisting of video signals with interposed synchronizing pulses is applied through a coupling condenser 1 to the control grid 2 of an amplifier valve 3 which may be of any suitable type but, for simplicity, is shown as a triode. In this embodiment it is assumed that the synchronizing pulses are as shown at A in the positive direction. The coupling condenser 1 should be as small as design considerations will allow as determined by the magnitude of the input capacity of the valve 3 and the amount of leakage current arriving to change the charge of the condenser. If the valve 3 is in cathode follower connection the coupling condenser 1 may be made very small indeed. The anode 4 of a first diode 5 is connected to the control grid 2 and the cathode 6 of the diode is connected through a resistance 7, which may be adjustable as shown to allow of adjustment of datum level, to a point of datum potential. The cathode 8 of a second diode 9 is also connected to the control grid 2 and the anode 10 of this diode is connected through a series resistance 11 to the junction point between a condenser 12 and resistance 13 of a resistance-capacity coupling network fed by an amplifier 14, succeeding the amplifier valve 3. Output to the next amplifying stage (not shown) is taken as indicated over the lead marked OUT. The amplifier 14 is such that the synchronizing signals in its output are, as conventionally represented at (B), in the same sense as at the grid 2 but of several times the amplitude of the whole signal at said grid. The greater the amplitude ratio the better the performance.

With this arrangement the condenser 12 in the coupling network from which the diode 9 is fed charges continually through the resistance 13 in said network from a potential source (not shown but to which one end of said resistance 13 is connected) at a potential whose difference from the datum potential level at the control grid 2 is several times the signal amplitude at said condenser 12. Thus the current through said resistance 13 is to a large extent independent of the amplitude of the wave form passing said condenser and therefore to a large extent independent of picture "whiteness." Charge collected on this condenser 12 is discharged through the series resistance 11 and the two diodes during synchronizing pulses. Accordingly the pulses of current through the diodes are determined in magnitude by the value of the resistance 13 in the resistance-capacity output coupling and the potential difference between the source to which said resistance is connected and the datum potential. The resistance 13 should be chosen to give a current flow through the diodes (during synchronizing pulses) large enough to allow undesired charge on the coupling condenser 1 to the valve 3 to be removed but not so large as to develope an unnecessarily large potential difference across the diode 5 during a pulse and thus correspondingly lift the potential of the condenser 12 in the output coupling network above datum. Said condenser 12 should be large enough to maintain a substantially constant current through the series resistance 11 and the two diodes throughout the synchronizing pulses, both framing and line synchronizing.

The value of the series resistance 11 is somewhat critical. It largely determines the difference between the average potential of the waveform out of the output coupling circuit condenser 12 and the datum. If $b$ is the amplitude between the datum level and "black" video signals in the composite signal and $a$ is the remaining amplitude of a synchronizing pulse i. e. the amplitude from datum level to the limit of the pulse away from the video signals—it will be obvious that $a$ should be large but it clearly must not be so large that the magnitude of $b$ becomes less than the synchronizing pulse amplitude on the condenser through which the grid of the valve is fed.

An essentially similar arrangement is used if the sense of the composite signal fed in to the amplifier valve 3 is the opposite to that described above, i. e. if the synchronizing pulses are in the negative direction. Such an arrangement is represented in Figure 2 which will be found practically self-explanatory since like references indicate like parts in Figs. 1 and 2. As will be seen the principal difference between Figs. 1 and 2 is the change, as between these two figures, in the senses of connection of the rectifiers 5 and 9.

The signal applied through the resistance 11 need not be derived as shown in Figs. 1 and 2 but may be obtained from any suitable source. It may, moreover, consist of correctly timed synchronizing signals only of correctly chosen amplitude and sense and such as to reach, or approximately reach, a predetermined voltage value.

I claim:

1. A thermionic valve amplifier having means for maintaining a predetermined datum level in the amplified signal output therefrom, said amplifier including a valve having at least a cathode, a control grid, and an anode, a source of datum potential, a source of input signals, a coupling condenser connected between said source of input signals and the control grid of said valve, a rectifier directly connected between said control grid and a point in said source of datum potential, a second rectifier arranged in inverse polarity relation to said first rectifier and having one electrode directly connected with said control grid, a succeeding amplifier, the other electrode of the second rectifier having a connection to a junction point connected through a condenser to a point in the succeeding amplifier and having a signal potential in phase with the signal potential at said control grid, said junction point being further connected through a resistor to an energy source connected to said datum potential point, and a resistance in series in said connection, said rectifiers being so connected that one rectifier is conductive towards said control grid and the other rectifier is conductive away from said control grid.

2. A thermionic valve amplifier having means for maintaining a predetermined datum level in the amplified signal output therefrom as set forth in claim 1 in which the capacity element in said coupling circuit has a value sufficient to maintain substantially constant current through the resistance in the connection from said coupling circuit to said second mentioned rectifier.

3. A thermionic valve amplifier having means for maintaining a predetermined datum level in the amplified signal output therefrom, said amplifier including a valve having at least a cathode, a control grid, and an anode, a source of datum potential, a source of input signals, a coupling condenser connected between said source of input signals and the control grid of said valve, a first and second rectifier each including a cathode and an anode, a connection from said control grid to the anode of said first rectifier and the cathode of the second rectifier, a connection from the cathode of said first rectifier to said source of datum potential, a succeeding amplifier, the other electrode of the second rectifier having a connection to a junction point connected through a condenser to a point in the succeeding amplifier and having a signal potential in phase with the signal potential at said control grid, said junction point being further connected through a resistor to an energy source connected to said datum potential point, and a resistance in series in said connection, said rectifiers being conductive in opposite directions with respect to said control grid.

4. A thermionic valve amplifier having means for maintaining a predetermined datum level in the amplified signal output therefrom, said amplifier including a valve having at least a cathode, a control grid, and an anode, a source of datum potential, a source of input signals, a coupling condenser connected between said source of input signals and the control grid of said valve, a first and second rectifier each including a cathode and an anode, a connection from said control grid to the cathode of said first rectifier and the anode of said second rectifier, a connection from the anode of said first rectifier to said source of datum potential, a succeeding amplifier, the other electrode of the second rectifier having a connection to a junction point connected through a condenser to a point in the succeeding amplifier and having a signal potential in phase with the signal potential at said control grid, said junction point being further connected through a resistor to an energy source connected to said datum potential point, and a resistance in series in said connection, said rectifiers being conductive in opposite directions with respect to said control grid.

References Cited in the file of this patent

UNITED STATES PATENTS

| Number | Name | Date |
| --- | --- | --- |
| 2,246,947 | Martinelli | June 24, 1941 |
| 2,269,590 | Lewis et al. | Jan. 13, 1942 |
| 2,390,502 | Atkins | Dec. 11, 1945 |
| 2,525,103 | Sprecher | Oct. 10, 1950 |
| 2,558,519 | Hill | June 26, 1951 |